United States Patent [19]
Elensky

[11] Patent Number: 6,050,069
[45] Date of Patent: Apr. 18, 2000

[54] WHEELED SUPPORT DEVICE FOR WEED TRIMMERS LEAF BLOWERS AND THE LIKE

[76] Inventor: Charles L. Elensky, 4191 Mountain Glen Trace, Lithonia, Ga. 30058

[21] Appl. No.: 09/354,211

[22] Filed: Jul. 15, 1999

Related U.S. Application Data

[60] Provisional application No. 60/093,023, Jul. 16, 1998, and provisional application No. 60/103,453, Oct. 6, 1998.

[51] Int. Cl.[7] .................................................... A01D 34/00
[52] U.S. Cl. ..................... 56/7; 56/2; 56/16.7; 280/47.24
[58] Field of Search ................................... 56/12.1, 16.7, 56/17.2, 17.5, 12.7, 2; 30/276; 280/47.24; 172/41, 42, 13, 14, 15, 17, 354, 358; D34/24, 12, 27; 37/265, 255

[56] References Cited

U.S. PATENT DOCUMENTS

| | | | |
|---|---|---|---|
| 4,182,100 | 1/1980 | Letter | 172/17 X |
| 5,092,112 | 3/1992 | Buckendorf, Jr. . | |
| 5,408,816 | 4/1995 | Cartier | 56/17.5 |
| 5,626,006 | 5/1997 | Fricke, Sr. | 56/16.7 X |
| 5,829,236 | 11/1998 | Ballard et al. | 56/16.7 |
| 5,836,142 | 11/1998 | Maxwell . | |
| 5,884,462 | 3/1999 | Gerber | 56/12.1 |

*Primary Examiner*—H. Shackelford
*Attorney, Agent, or Firm*—Hughes & Kaplan; Barry E. Kaplan, Esq.

[57] ABSTRACT

A triangularly shaped frame having truncated and flattened vertices serves as a structural load-bearing member for an attachment to a yard tending device, such as a gas powered yard trimmer or leaf blower. A pair of support and maneuvering wheels is affixed to the frame. Affixed centrally to the frame, and rising generally vertically therefrom, is the first end portion of a lawn tending device support bar. At its first end portion, the support bar is of generally straight configuration. This straight portion serves to hold the lawn tending device at a sufficient elevation with respect to the ground. The straight portion of the support bar smoothly transitions to generally declining compound arcuate spanning portion. The spanning portion smoothly transitions to a generally declining straight second end portion. The second end is formed such that it comprises a cradle or channel running centrally and axially according to the length of the second end portion. The cradle portion serves to center the shaft of the yard tending device, to minimize rotation of the device, and to aid in the firm clamping of the device to the attachment. Optionally provided at the uppermost truncated vertex of the frame of the attachment is a bracket that may be used as an alternate mounting surface for affixing yard tending devices such as a leaf blower. Various clamps are provided to ensure that the yard tending device may be firmly affixed to the attachment of the present invention.

18 Claims, 3 Drawing Sheets

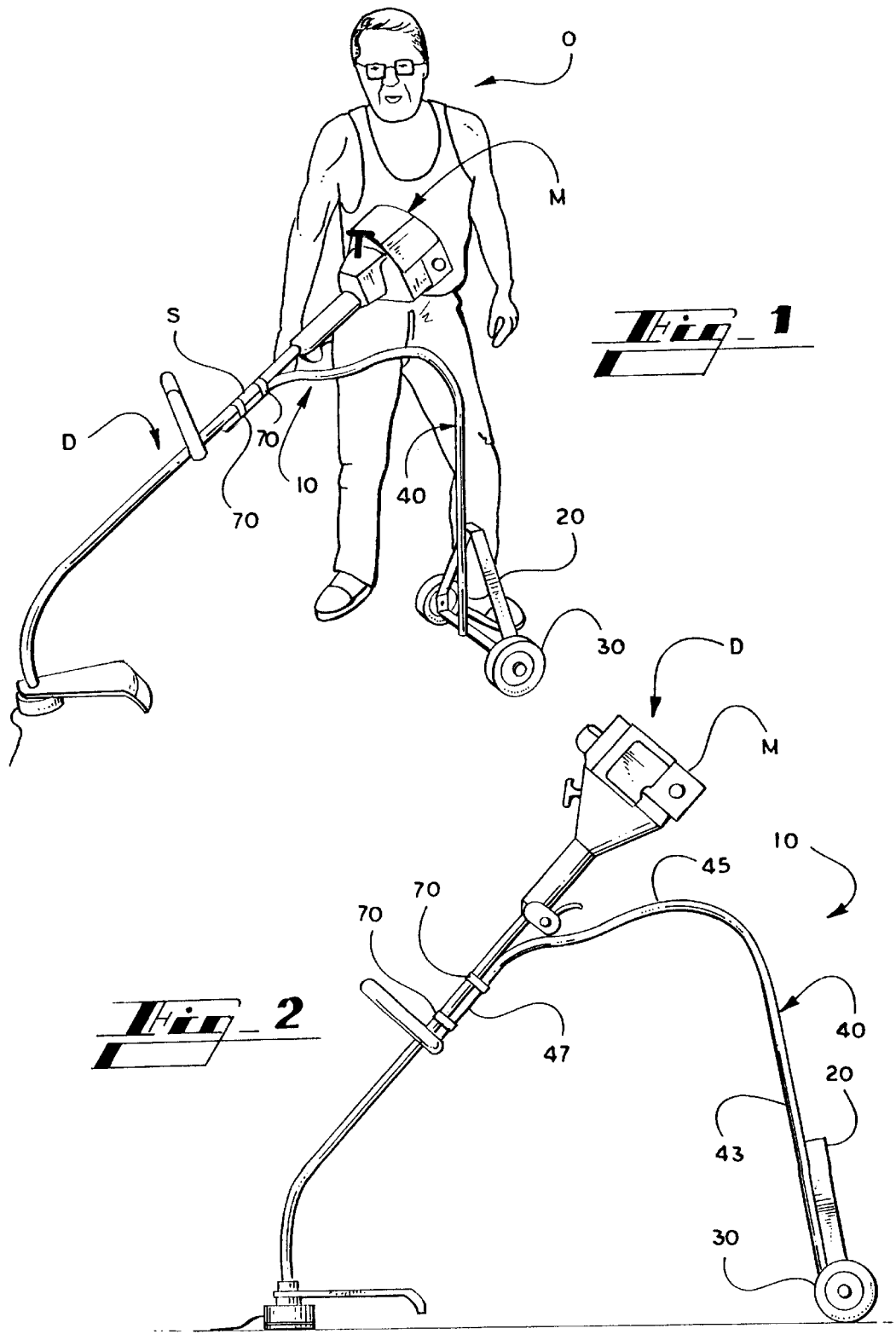

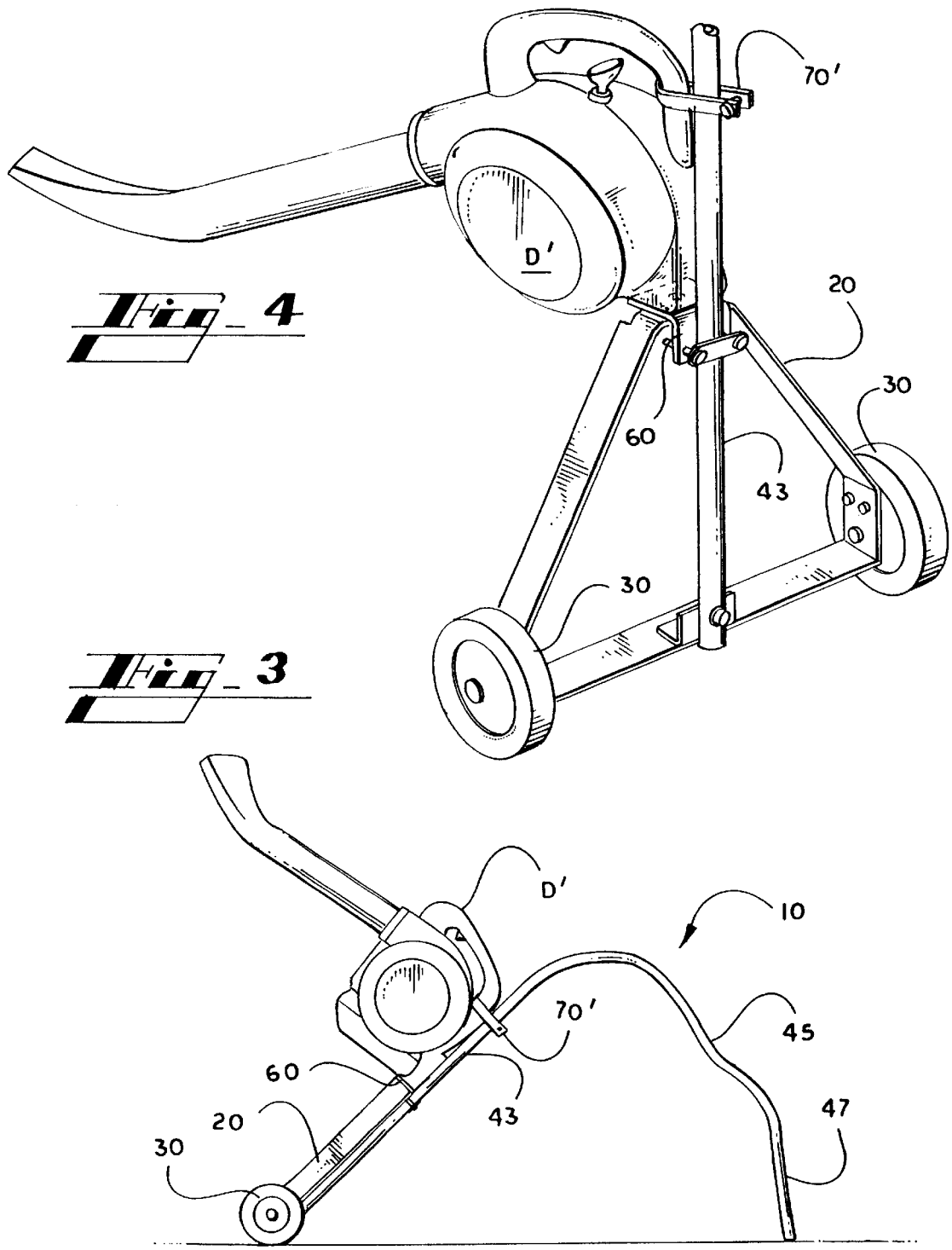

WHEELED SUPPORT DEVICE FOR WEED TRIMMERS LEAF BLOWERS AND THE LIKE

RELATED APPLICATIONS

The inventor hereof claims priority based upon and pursuant to provisional patent application Ser. No. 60/093,023 filed on Jul. 16, 1998 and provisional patent application Ser. No. 60/103,453 filed on Oct. 6, 1998.

FIELD OF THE INVENTION

This invention relates generally to a wheeled attachment for handheld lawn tending devices, and more particularly to a wheeled attachment and frame assembly for attachment to a gasoline powered weed trimmer, leaf blower, edger, or other similar device.

BACKGROUND OF THE INVENTION

Handheld lawn tending devices, such as gasoline powered weed trimmers, leaf blowers, edgers, and the like, have found popularity among both homeowners and commercial providers of lawn maintenance services. Such devices, however, are often heavier than their electrically powered counterparts. The weight of such gasoline powered devices tends to be centered proximate to the handle area, in part, in order to provide some measure of comfort in their use.

Notwithstanding the design of the lawn tending device, the operator usually must remain in a standing and upright position in order to perform work using the device. Additionally, the operator is required to hold the device away from his body and maneuver the device in a generally sweeping manner. The vibration of the device, its weight, and thereby its inertia, combined with the sweeping motion often used in maneuvering the device, along with the extended length of time typically required to perform the task at hand, may lead to twisting and straining of the back, general muscular fatigue, and various other harmful physical stresses.

In an attempt to minimize such physical fatigues and stresses, some such lawn tending devices are provided with means to affix a harness or shoulder strap. While the use of such harnesses and straps may provide a degree of short term relief to the operator, they still concentrate the weight and vibration of the device along the operator's back. Additionally, in order to refuel or restart the device, the device must be removed from the operator's body, set down, and finally retrieved in a bending and hoisting motion. Such maneuvers, again, put the operator at risk for physical injury or discomfort. Ultimately, such harnesses and straps are not an ideal solution to the identified problem.

In recognition of the identified problems attendant to the use of such lawn tending devices, others have provided various support structure attachments to accommodate the weight of the lawn tending device. One example of such an attachment may be seen with reference to U.S. Pat. No. 5,092,112 to Buckendorf, Jr. (Mar. 3, 1992). This attachment, however, is affixed proximate to the center of the lawn trimmer shaft. While useful for electrically powered trimmers, the weight of a gasoline powered engine is seen to tip the device toward the operator. The operator, therefore, still must bear a significant portion of the weight of the trimmer, and the maneuverability of the combination necessarily is thereby reduced. Additionally, because the position of the attachment is preferably along the approximate midline of the lawn trimmer shaft, its wheels tend to interfere with the stride of the operator as he walks alongside the device.

Another example of a useful attachment for a lawn tending device may be seen with reference to U.S. Pat. No. 5,836,142 to Maxwell (Nov. 17, 1998). This attachment, however, provides a pair of frame assemblies for attachment to the lawn trimmer. Because one of the pair of frame assemblies may be disposed approximately parallel to the ground during its normal operation, and because the attachment is dually affixed along the lawn trimmer shaft, the wheel and horizontal frame combination of the attachment, again, tend to interfere with the stride of the operator as he walks alongside the device.

Additionally, neither of the above referenced prior art attachments successfully may accommodate such other common devices as gasoline powered leaf blowers, whereby it is desirable to provide the benefits recognized hereinabove.

It is readily apparent that an improved wheeled attachment and frame assembly for affixing to a gasoline powered weed trimmer, leaf blower, edger, or other similar lawn tending device is needed to overcome the drawbacks apparent in the prior art, and to render more safe and convenient the use of the lawn tending device. It is, therefore, to the provision of such an improved wheeled attachment and frame assembly that the present invention is directed.

BRIEF SUMMARY OF THE INVENTION

The present invention overcomes the aforementioned deficiencies in the prior art attachments by providing an improved wheeled attachment for use with powered weed trimmers, leaf blowers, edgers, or other similar lawn tending devices. In the preferred embodiment of the invention, a generally triangularly shaped frame having truncated and flattened vertices serves as a structural load-bearing member for the attachment. Each of a pair of support and maneuvering wheels is affixed at the two truncated vertices disposed closest to the ground. Affixed centrally to the frame, and rising generally vertically therefrom, is the first end portion of a lawn tending device support bar. At its first end portion, the support bar is of generally straight configuration. This straight portion serves to hold the lawn tending device at a sufficient elevation with respect to the ground. The straight portion of the support bar preferably smoothly transitions to a compound arcuate spanning portion, running on average according to a slightly declining, but generally horizontal, line. The spanning portion preferably smoothly transitions to a generally straight second end portion. The second end portion further declines from the horizontal toward the ground. The second end is formed such that it comprises a cradle, channel, or other similar structural configuration running centrally and axially according to the length of the second end portion. The cradle portion serves to center the shaft of the yard tending device, to minimize rotation of the device, and to aid in the firm clamping of the device to the attachment.

In this configuration, the spanning portion runs toward, and serves to offset, the center of lawn tending device shaft from the attachment's frame. With a sufficient spanning portion length, the motor of the lawn tending device will be inside of, and between, the wheels and the point of affixation of the attachment to the yard tending device. In this manner, the weight of the motor of the yard tending device is borne predominantly by the attachment, and not by the operator. There is ample room for the operator to move unhindered next to his device. The compound arcuate shape of the spanning portion provides ample hand room to the operator so that he may trigger his device unimpeded. The tripod shape of the combined device and attachment serves to form a stand for the device, to stabilize the device, and to render convenient the resting of the cutter portion of the device upon the ground for refueling and starting. The yard tending device may be rotated about the wheels and the motor thereof rested upon the ground. In this manner, the device is stabilized and made safe for the operator's convenience in maintenance of the device's cutter assembly.

Optionally provided and affixed at the uppermost truncated vertex of the frame of the attachment is a bracket, elbow, hinge, or other similar structural member. This bracket may be used as an alternate mounting surface for affixing such diversely designed yard tending devices as a leaf blower. So configured, the attachment preferably holds the leaf blower in a fashion such that its air outlet is disposed opposite to the spanning portion of the support bar; and, its weight is disposed closely adjacent to the attachment's frame and wheel assembly. In this configuration, the support bar conveniently may be utilized by the operator as a handle and lever, in order to better maneuver the leaf blower.

In each of the above described configurations and embodiments, various clamps are provided to ensure that the yard tending device may be firmly affixed to the attachment of the present invention.

The attachment of the present invention, therefore, advantageously allows the operator to position his lawn tending device upon the attachment according to the weight distribution of his particular device; thereby, optimizing the overall balance, performance, and efficacy of the combined structure so formed. The attachment of the present invention further allows legroom to accommodate the stride of the operator as he walks alongside the device. The attachment provides sufficient room to accommodate the hand of the operator proximate the trigger of a typical trimmer device. The present invention also provides for use of the attachment with diversely configured lawn tending equipment, such as a leaf blower.

Accordingly, the several objectives of the present invention are:

To provide an attachment for a yard tending device, such as a rotating trimmer, an edger, or a leaf blower, that will accommodate diverse brands and types of such lawn tending devices;

To provide an attachment for a yard tending device that allows the operator to position his lawn tending device upon the attachment according to the weight distribution of his particular device; thereby, optimizing the overall balance, performance, and efficacy of the combined structure so formed;

To provide an attachment for a yard tending device that further allows legroom to accommodate the stride of the operator as he walks alongside the device;

To provide an attachment for a yard tending device that provides sufficient room to accommodate the hand of the operator proximate the trigger of a typical trimmer device;

To provide an attachment for a yard tending device that reduces injurious stresses upon the operator of the device;

To provide an attachment for a yard tending device that may serve as a stand for the device, in order to stabilize the device and to render convenient the resting of the cutter portion of the device upon the ground for refueling and starting;

To provide an attachment for a yard tending device such that the device may be rotated about the wheels and the motor of the attachment and rested upon the ground for the operator's convenience and safety in maintenance of the device;

To provide an attachment for a yard tending device that is lightweight convenient to transport and store; and, To provide an attachment for a yard tending device that is economical to manufacture, and is simple in its design and use.

These and other objects, features, and advantages of the present invention will become apparent to those skilled in the art by reference to the drawings and to the detailed description of the preferred embodiment presented herein.

BRIEF DESCRIPTION OF THE DRAWINGS

The invention is better understood by reading the Detailed Description of the Preferred Embodiments with reference to the accompanying drawing figures, in which like reference numerals denote similar structure and refer to like elements throughout, and in which:

FIG. 1 is a perspective view of the preferred embodiment of the attachment for a yard tending device of the present invention, and further illustrating an efficient height in relation to the operator thereof;

FIG. 2 is a side view of the attachment for a yard tending device of the present invention demonstrating the use of the attachment with a gas powered lawn trimmer;

FIG. 3 is a side view of an alternate embodiment of the attachment for a yard tending device of the present invention, demonstrating its use with a gas powered leaf blower;

FIG. 4 is a partial perspective view of the alternate embodiment of the attachment for a yard tending device of the present invention;

Figure 6:
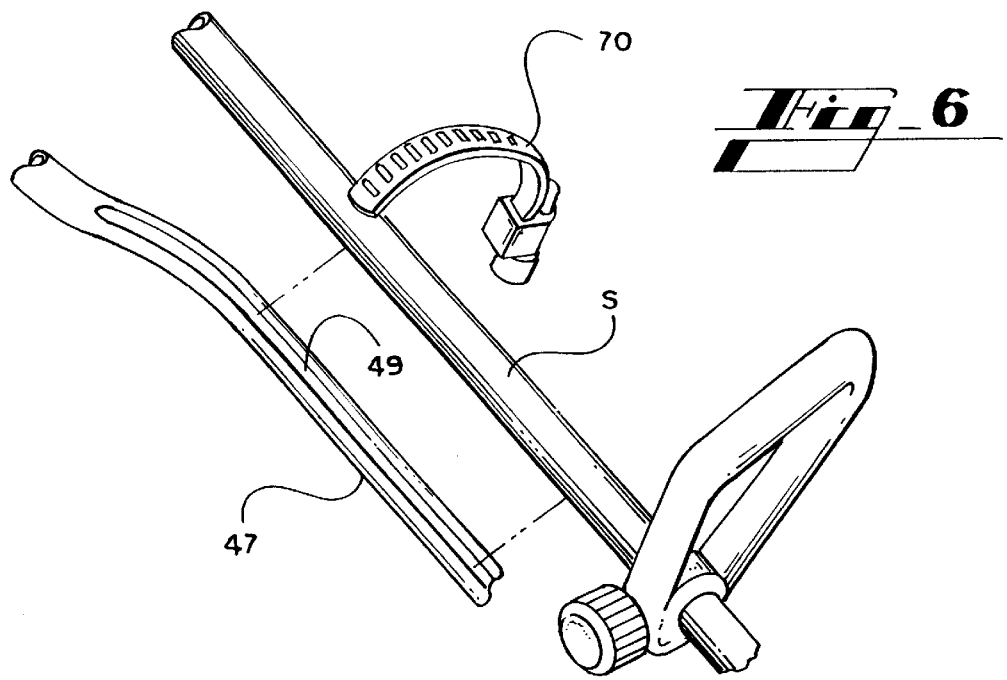

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF PREFERRED EMBODIMENTS

In describing preferred embodiments of the present invention illustrated in the Figures, specific terminology is employed for the sake of clarity. The invention, however, is not intended to be limited to the specific terminology so selected, and it is to be understood that each specific element includes all technical equivalents which operate in a similar manner to accomplish a similar purpose.

In all embodiments discussed herein, it is preferred that the materials utilized for construction of the invention be of lightweight, yet sturdy composition. Acceptable materials may comprise, for example, aluminum or structural plastics; however, it will be appreciated that the invention may be manufactured from other materials which are well known in the art, and which may have any of a variety of cross-sections, so long as the materials so selected are strong, yet lightweight and workable. The materials may be coated or otherwise treated in selected zones in a manner well known in the art to provide additional vibration dampening or corrosion resistant properties, all without departing from the scope and spirit of the disclosed invention.

The present invention provides an improved wheeled attachment for use with powered weed trimmers, leaf blowers, edgers, or other similar lawn tending devices. In accordance with the present invention, therefore, shown in FIGS. 1 and 2 is the preferred embodiment of the attachment 10 for a yard tending device D of the present invention.

FIG. 1 further illustrates an efficient height in relation to the operator O thereof. In the preferred embodiment of the invention, a generally triangularly shaped frame 20 having truncated and flattened vertices serves as a structural load-bearing member for the attachment 10. Each of a pair of support and maneuvering wheels 30 is affixed at the two truncated vertices disposed closest to the ground. Affixed centrally to the frame, as with bolts, welding, or the like, and rising generally vertically therefrom, is a lawn tending device support bar 40. Support bar 40 comprises a first end portion 43, a compound arcuate spanning portion 45, and a second end portion 47.

At its first end portion 43, the support bar 40 is of generally straight configuration. This straight first end portion 43 serves to hold the lawn tending device D at a sufficient elevation with respect to the ground. The straight first end portion 43 of the support bar 40 preferably smoothly transitions to a compound arcuate spanning portion 45, running on average according to a slightly declining, but generally horizontal, line. The spanning portion 45 preferably smoothly transitions to a generally straight second end portion 47. The second end portion 47 further declines from the horizontal toward the ground.

As can best be seen with reference to FIG. 6, the second end portion 47 is formed such that it comprises a cradle 49. Cradle 49, of course may be formed as a channel, or other similar structural configuration. Cradle 49 runs centrally and axially according to the length of the second end portion 47. The cradle portion 49 serves to center the shaft S of the yard tending device D, to minimize rotation of the device D, and to aid in the firm clamping of the device D to the attachment 10.

In this configuration, the spanning portion 45 runs toward, and serves to offset, the center of lawn tending device D shaft S from the frame of attachment 10. With a sufficient spanning portion length, the motor M of the lawn tending device D will be inside of, and between, the wheels 30 and the point of affixation of the attachment 10 to the yard tending device D. In this manner, the weight of the motor M of the yard tending device D is borne predominantly by the attachment 10, and not by the operator O. There is ample room for the operator O to move unhindered next to his device D. The compound arcuate shape of the spanning portion 45 provides ample hand room to the operator so that he may trigger his device D unimpeded. The tripod shape of the combined device and attachment serves to form a stand for the device D, to stabilize the device D, and to render convenient the resting of the cutter portion of the device D upon the ground for refueling and starting. The yard tending device D may be rotated about the wheels 30 and the motor M thereof rested upon the ground. In this manner, the device is stabilized and made safe for the operator's convenience in maintenance of the device's cutter assembly.

Figure 5:
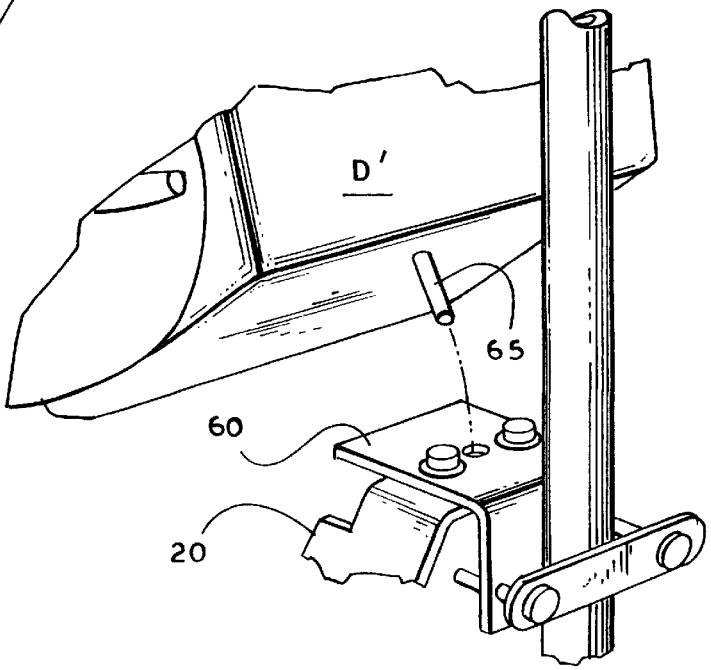
FIG. 5 is a partial perspective view of the mounting bracket according to the alternate embodiment of the present invention demonstrated in FIG. 3; and, FIG. 6 is a partial perspective view of the second end of the support bar of the attachment for a yard tending device of the present invention, demonstrating one form of a cradle for securing a shaft of a yard tending device thereto.

As best seen with reference to FIGS. 3 through 5, optionally provided and affixed, as with bolts, welding, or the like, at the uppermost truncated vertex of the frame 20 of the attachment 10 is a bracket 60. It will be appreciated that bracket 60 might take the form of an elbow, hinge, or other similar structural member. This bracket 60 may be used as an alternate mounting surface for affixing such diversely designed yard tending devices as a leaf blower D'. So configured, the attachment 10 preferably holds the leaf blower D' in a fashion such that its air outlet is disposed opposite to the spanning portion 45 of the support bar 40; and, its weight is disposed closely adjacent to the attachment's frame and wheel assembly. In this configuration, the support bar conveniently may be utilized by the operator O as a handle and lever, in order to better maneuver the leaf blower D'.

Leaf blower D' may be affixed to bracket 60 through use of screw 65, or through the use of a pin and hole arrangement as is well known in the art.

In each of the above described configurations and embodiments, various clamps 70, 70' are provided to ensure that the yard tending device may be firmly, yet removably, affixed to the attachment 10 of the present invention. For example, demonstrated in FIG. 6 is a typical screw-and-slot hose clamp 70 of the type often used in automotive and heating, ventilation, and air conditioning applications. By contrast, demonstrated in FIG. 4 is a generally U-shaped clamp 70' joined by a screw and nut combination. It, thus, will be appreciated that any banding-type clamp having sufficient strength to firmly, yet removably, affix the yard tending device to the attachment 10 successfully may be used.

As disclosed herein, the attachment 10 of the present invention, therefore, advantageously allows the operator O to position his lawn tending device upon the attachment 10 according to the weight distribution of his particular device D, D'; thereby, optimizing the overall balance, performance, and efficacy of the combined structure so formed. The attachment 10 of the present invention further allows legroom to accommodate the stride of the operator O as he walks alongside the device D, D'. The attachment 10 provides sufficient room to accommodate the hand of the operator promate the trigger of a typical trimmer device D. The attachment 10 of the present invention also provides for use of the attachment 10 with diversely configured lawn tending equipment, such as a leaf blower D'.

It will be appreciated by those ordinarily skilled in the art that attachment 10 may be provided with bolted connections, welded connections, or other firm connections to frame 20 without departing from the scope and spirit of the invention. Additionally, alternative configurations for frame 20, and for the overall length and shape of support bar 40 may be utilized without departing from the scope and spirit of the invention.

Having thus described exemplary embodiments of the present invention, it should be noted by those ordinarily skilled in the art that the within disclosures are representative only of the present invention, and that various other alternatives, adaptations, and modifications may be made within the scope and spirit of the present invention. Accordingly, the present invention is not limited to the specific embodiments as illustrated herein, but is only limited by the following claims.

I claim:

1. A wheel attachment for connecting to and supporting a handheld lawn tending device, the lawn tending device having a power unit at an operating end, said attachment comprising:

a frame having at least a lower portion and an upper portion;

a pair of wheels rotatably affixed to said lower portion of said frame;

a support bar affixed to said upper portion of said frame, said support bar comprising a first end portion, an arcuate spanning portion, and a second end portion; and, means for removably affixing said attachment to the lawn tending device;

wherein said first end portion serves to hold the lawn tending device at a sufficient elevation with respect to the ground, said arcuate spanning portion serves to offset the lawn tending device from said frame, and said second end portion, in combination with said affixing means, serves to removably affix the lawn tending device to said attachment, the entire combination being rollable upon said wheels.

2. The wheel attachment of claim 1 wherein the length of said arcuate spanning portion is sufficient to locate the power unit of the lawn tending device inside of and between said wheels and the point of affixation of said attachment to the lawn tending device.

3. The wheel attachment of claim 1 wherein said frame is of triangular shape having truncated and flattened vertices.

4. The wheel attachment of claim 1 wherein said arcuate spanning portion comprises a compound arcuate shape.

5. The wheel attachment of claim 1 wherein said second end portion further comprises a channel.

6. The wheel attachment of claim 1 wherein said means for removably affixing the lawn tending device to said attachment is a clamp.

7. The wheel attachment of claim 1 further comprising a mounting bracket disposed adjacent said upper portion of said frame for mounting the lawn tending device in an alternate fashion.

8. The wheel attachment of claim 7 wherein said mounting bracket is disposed to orient the lawn tending device approximately opposite the direction of said second end portion, whereby said second end portion may be used as a maneuvering handle for the lawn tending device.

9. A wheel attachment for connecting to and supporting a handheld lawn tending device, the lawn tending device having a power unit at an operating end, said attachment comprising:

a frame having at least a lower portion and an upper portion;

a pair of wheels rotatably affixed to said lower portion of said frame;

a support bar affixed to said upper portion of said frame, said support bar comprising a first end portion, an arcuate spanning portion, and a second end portion, said arcuate spanning portion protecting from said frame such that the lawn tending device may be held remotely from said frame; and, means for removably affixing said attachment to the lawn tending device;

wherein said first end portion serves to hold the lawn tending device at a sufficient elevation with respect to the ground and said second end portion, in combination with said affixing means, serves to removably affix the lawn tending device to said attachment, the entire combination being rollable upon said wheels.

10. The wheel attachment of claim 9 wherein the length of said arcuate spanning portion is sufficient to locate the power unit of the lawn tending device inside of and between said wheels and the point of affixation of said attachment to the lawn tending device.

11. The wheel attachment of claim 9 wherein said frame is of triangular shape having truncated and flattened vertices.

12. The wheel attachment of claim 9 wherein said arcuate spanning portion comprises a compound arcuate shape.

13. The wheel attachment of claim 9 wherein said second end portion further comprises a channel.

14. The wheel attachment of claim 9 wherein said means for removably affixing the lawn tending device to said attachment is a clamp.

15. The wheel attachment of claim 9 further comprising a mounting bracket disposed adjacent said upper portion of said frame for mounting the lawn tending device in an alternate fashion.

16. The wheel attachment of claim 15 wherein said mounting bracket is disposed to orient the lawn tending device approximately opposite the direction of said second end portion, whereby said second end portion may be used as a maneuvering handle for the lawn tending device.

17. A wheel attachment for connecting to and supporting a handheld lawn tending device, the lawn tending device having a power unit at an operating end, said attachment comprising:

a frame having at least a lower portion and an upper portion;

a pair of wheels rotatably affixed to said lower portion of said frame;

a support bar affixed to said upper portion of said frame, said support bar comprising a first end portion, a compound arcuate spanning portion, and a second end portion, said second end portion having a channel formed therein; and, means for removably affixing said attachment to the lawn tending device;

wherein said compound arcuate spanning portion has sufficient length to locate the power unit of the lawn tending device proximate to said wheels and the point of affixation of said attachment to the lawn tending device, and wherein said first end portion serves to hold the lawn tending device at a sufficient elevation with respect to the ground, and said second end portion, in combination with said affixing means, serves to removably affix the lawn tending device to said attachment, the entire combination being rollable upon said wheels.

18. The wheel attachment of claim 17 wherein said means for removably affixing the lawn tending device to said attachment is a clamp.

* * * * *